(12) United States Patent
Burckart et al.

(10) Patent No.: US 8,261,198 B2
(45) Date of Patent: Sep. 4, 2012

(54) AUTOMATIC CO-BROWSING INVITATIONS

(75) Inventors: Eric John Burckart, Raleigh, NC (US); Andrew Ivory, Wake Forrest, NC (US); Todd Eric Kaplinger, Raleigh, NC (US); Aaron Kyle Shook, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 12/826,767

(22) Filed: Jun. 30, 2010

(65) Prior Publication Data

US 2012/0005598 A1   Jan. 5, 2012

(51) Int. Cl.
  *G06F 3/00* (2006.01)
(52) U.S. Cl. ........ 715/753; 709/204; 709/205; 709/206; 709/207; 715/751
(58) Field of Classification Search .......... 715/751, 715/753; 705/3
See application file for complete search history.

(56) References Cited

U.S. PATENT DOCUMENTS

| | | | |
|---|---|---|---|
| 7,219,072 B1 | 5/2007 | Sundaresan | |
| 7,287,054 B2 | 10/2007 | Lee et al. | |
| 2005/0021947 A1* | 1/2005 | Doyle et al. | 713/164 |
| 2006/0129642 A1 | 6/2006 | Qian et al. | |
| 2007/0282887 A1 | 12/2007 | Fischer et al. | |
| 2009/0030981 A1* | 1/2009 | Knoepp et al. | 709/204 |
| 2009/0172565 A1* | 7/2009 | Jackson et al. | 715/753 |
| 2009/0265255 A1 | 10/2009 | Jackson et al. | |
| 2009/0292618 A1* | 11/2009 | Chatila | 705/26 |
| 2010/0030578 A1* | 2/2010 | Siddique et al. | 705/3 |
| 2012/0084292 A1* | 4/2012 | Liang et al. | 707/741 |

OTHER PUBLICATIONS

Agarwal, Suprotim, "Detect Copy, Paste and Cut operations on a TextBox using jQuery", Jul. 8, 2009, http://www.devcurry.com/2009/07/detect-copy-paste-and-cut-operations-on.html, pp. 1-3.*
"JavaScript Events", Dec. 17, 2008, http://www.w3schools.com/js/js_events.asp, pp. 1-2.*
"JavaScript Event Reference", Dec. 16, 2008, http://www.w3schools.com/jsref/jsref_events.asp, pp. 1-2.*
Hoyos-Rivera et al., "CoLab: A Flexible Collaborative Web Browsing Tool", 19th International Conference on Advanced Information Networking and Applications, 2005. AINA 2005. V.
http://www.shopwithyourfriends.com/ <retrieved on May 14, 2010>.
Tedeschi, "Like Shopping? Social Networking? Try Social Shopping," NY Times, Sep. 11, 2006.
http://www.yourhtmlsource.com/javascript/popupwindows.html <last updated Apr. 8, 2010, retrieved Jun. 30, 2010>.

* cited by examiner

*Primary Examiner* — Stephen Hong
*Assistant Examiner* — James G Pohlman
(74) *Attorney, Agent, or Firm* — Grasso PLLC

(57) ABSTRACT

Embodiments can include instructions or steps, which when carried out, detect that copy operations are being performed on website data displayed to a user. Further to this detection, a co-browsing query for display to a user may be generated, an instruction to associate a co-browsing invitation with website data copied by the user may also be generated and a co-browsing invitation and pasted website data may be sent to an invitee.

20 Claims, 6 Drawing Sheets

AUTOMATIC CO-BROWSING INVITATIONS

BACKGROUND

The present invention relates to shared browsing sessions where two or more users may each participate in or experience a browsing session that is underway. Methods, systems, apparatus, and articles of manufacture are provided wherein prompts are generated and sent to a first user engaged in a copy/paste operation and wherein an invitation is provided to a second user to determine whether a co-browsing session between the first user and the second user should be established.

Browsing websites is a popular activity in contemporary society. Websites hosted by servers are visited by individuals employing HTML or other code to display the information from the website and to interact with the website visitors. Websites provide innumerable services and information. These services can include selling merchandise for consumers, providing information on various topics, and providing financial services. When products are sold or services are provided a consumer may exchange information with the website during the session and ahead of purchases being made.

As described herein, embodiments of the invention may be directed to promoting shared browsing sessions, where consumers exchanging information with a website and/or consumers considering purchases from a website may be prompted to create a co-browsing session when copy/paste operations are employed by the consumer.

BRIEF SUMMARY

Methods, apparatus, and articles of manufacture are included in embodiments of the invention. These embodiments can include instructions or steps, which when carried out, detect that copy operations are being performed on website data displayed to a user; generating a co-browsing query for display to a user; receiving, in response to the co-browsing query, an instruction to associate a co-browsing invitation with website data previously displayed to the user and previously copied by the user; and, sending the associated co-browsing invitation and pasted website data to an invitee.

The instructions or steps, in embodiments, may further provide: updating session information that an invitation for co-browsing has been created and sent; and periodically polling session information to determine if a previously sent invitation for co-browsing has been accepted. Furthermore, embodiments may also include creating a co-browsing session on a website when the co-browsing invitation is accepted and an invitation recipient has an established browsing session on the website.

In embodiments, the website data being copied may be services or merchandise offered for sale and the copy operations detected may be performed in a web-browser. Other steps, methods, devices, and articles may also be employed in embodiments of the invention.

DETAILED DESCRIPTION

Figure 1A:
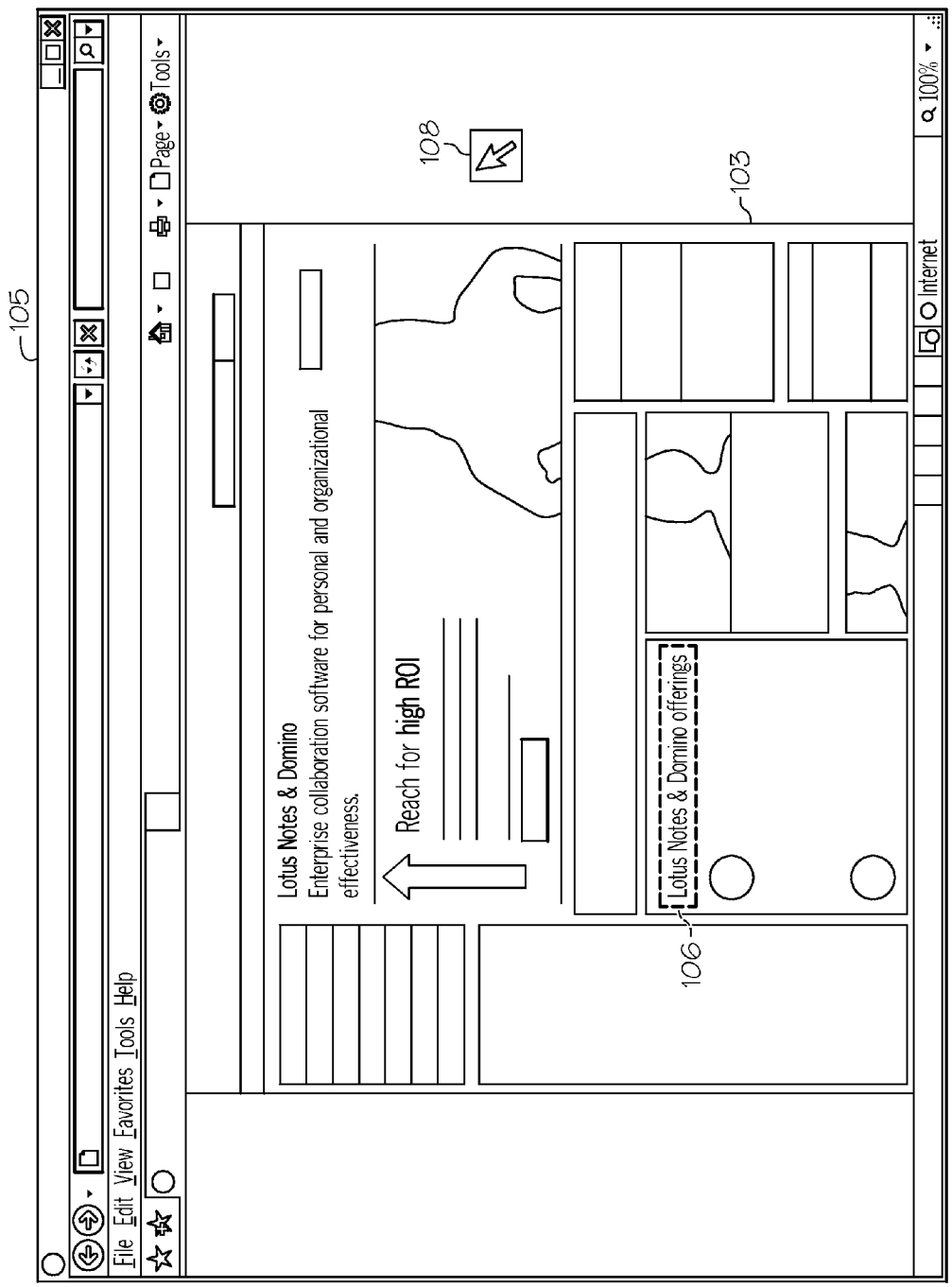
FIG. 1A shows an exemplary screen shot for a first user engaged in a co-browsing session in accord with embodiments of the invention.

Embodiments include systems, methods, apparatus, and articles of manufacture related to and regarding co-browsing sessions, prompting the creation of co-browsing sessions, and generating invitations for co-browsing sessions. In embodiments, invitations may be generated for a user, at a client by a client plug-in or elsewhere, when the user initiates a copy/paste operation at a website. When a copy/paste operation is detected locally or at a web server, a query may be generated and sent to the user to determine whether the user is interested in prompting a recipient of copy/pasted material from the website to co-browse with the user. If the user responds affirmatively to sending an invitation, a co-browse invitation may be generated and the copy/paste material may be embedded with an invitation to invite the recipient to join the user's web-browsing session. As discussed herein, a co-browse plug-in or servlet or both may be employed to carry out the query operation, the invitation operation, and other actions or steps of embodiments of the invention.

In an example, a consumer may be shopping at a consumer website, may identify a product of interest, and may begin a copy/paste operation in order to share that product with another. In embodiments, a plug-in in the user's web browser may determine that a copy/paste operation is underway and may, consequently, generate a query for the consumer to determine whether the consumer wants the copy/paste designated material to include or have associated with it, an invitation to co-browse or shop with the consumer. If the consumer affirms that an invitation should be included, an invitation may be embedded during the copy/paste operation and the invitation may be sent to an invitee along with the copy/paste information, e.g., the picture of the merchandise. In embodiments, upon receipt by the invitee, an invitation may be presented to the invitee to determine whether the invitee wants to co-browse with the consumer, the first user. Then, in embodiments, if the invitee indicates that he or she is interested in co-browsing, i.e. accepts the invitation, a co-browsing session may be initiated and maintained. This may include accenting or otherwise highlighting the copy/paste subject matter.

Embodiments of the invention may include the use of browser plug-ins configured to generate queries for users engaged in copy/paste operations. These plug-ins may serve to automatically generate a query to determine if a user wants to invite a peer to a browsing session. The plug-in may also generate queries according to criteria established or designated in the browser. The plug-in may further serve to monitor the user's browsing activity, to determine whether the copy/paste operation is being employed in a shopping environment, i.e. on a website that is engaged in selling products or services. And, when shopping sites are identified, begin the query/invitation routine. Comparatively, when the website is considered not to be a shopping website, the plug-in may refrain from beginning the query/invitation routine. Still further, the plug-in may invoke the query/invitation routine when designated web-site criteria are met. For example, in embodiments, a query may be generated for dynamic financial websites and other websites where collaboration with an advisor may be advantageous. Likewise, a user may choose not to have queries generated when informational websites are being browsed and copy/paste activities are initiated.

In embodiments, a plug-in or servlet may also work to limit or streamline a link accompanying an invitation to create or join a browsing session. This streamlining may include updating session information with copy/paste operation information such that these copy/paste operations need not be included in the link accompanying an invitation. When a co-browsing session is initiated or updated, the session information may be used to designate the material previously identified by the consumer for copy/paste operations. Thus, in embodiments, a friend receiving an invitation to co-browse, and seeing some or all of the copy/paste materials along with the invitation, may see these same materials highlighted on a website once the co-browse session is initiated.

In embodiments, the servlet may be a co-browse engine that may work in conjunction with the client plug-in or in lieu of the plug-in. The co-browse engine may be resident on a website server and may be used to identify whether copy/paste operations of products or services are being conducted. If copy/paste operations are being conducted, the co-browse engine can prompt a client side plug-in to initiate a query regarding creating an invitation or may generate and send the query itself. The co-browse engine, like the co-browse plug-in, may also act to track session information from the client from the existing session and from previous sessions to enhance the browsing and the co-browsing session. In embodiments, the co-browse engine may scan for accepted invitations and may query session information to determine whether previously designated copy/paste material needs to be highlighted or otherwise designated on the invitee's session display.

Figure 1B:
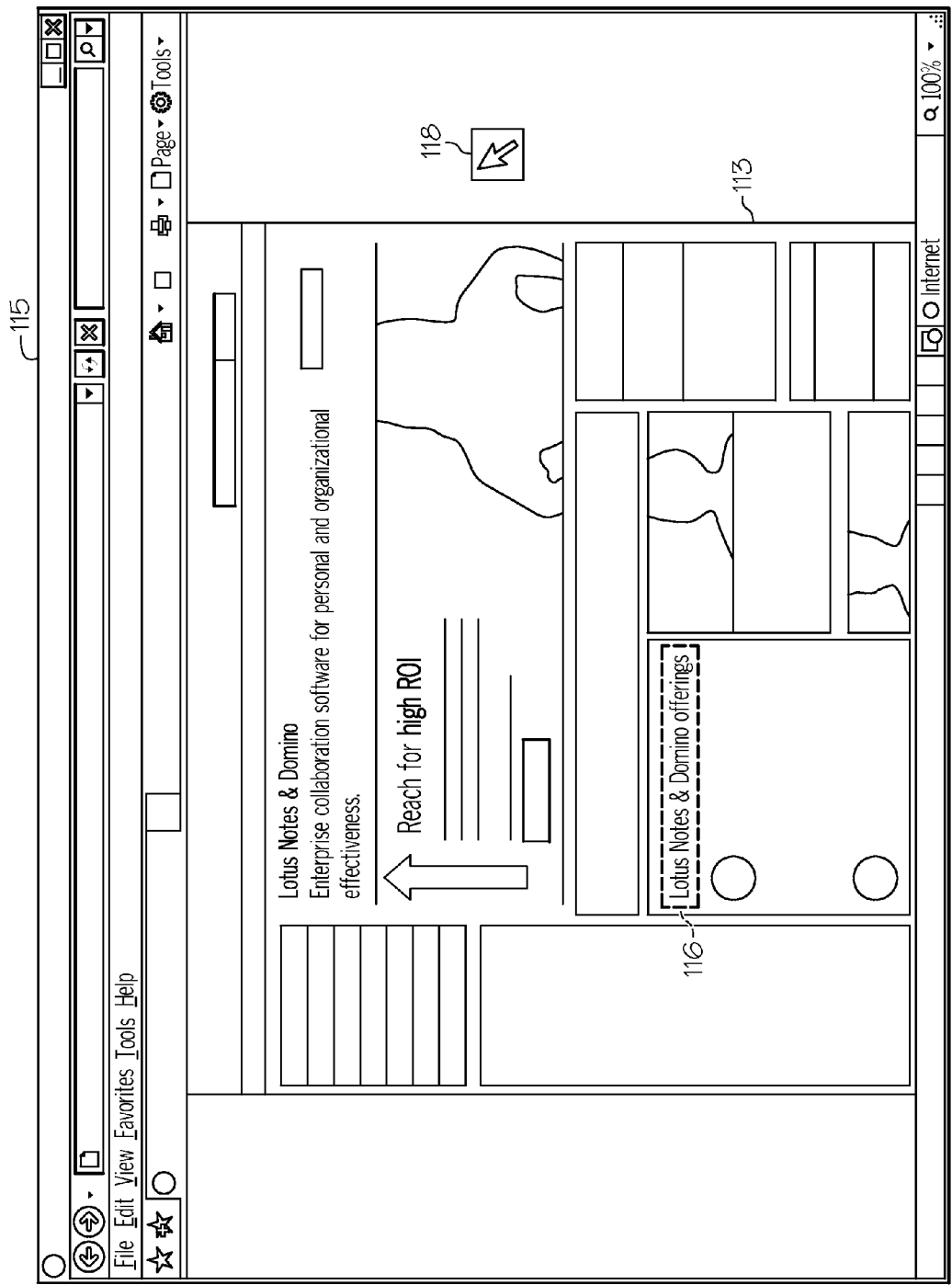
FIG. 1B shows an exemplary screen shot for a second user engaged in a co-browsing session in accord with embodiments of the invention.

FIG. 1A and FIG. 1B show screen shots of peers involved in a co-browsing session according to embodiments of the invention. Co-browsing sessions may differ from proxy sessions in that each peer in the session may be interacting with the server or other source of displayed browser information. Browser commands, steps, and instructions carried out by one user may be replicated on a peer's browser. This replication may include communications between the server and each peer, rather than a peer-to-peer type of proxy or screen share.

FIG. 1B shows the screen of a peer involved in a co-browsing session with the peer user whose screen is shown in FIG. 1A. As can be seen, each user's screen includes an open browser 105 and 115, in this case Windows® Explorer. Within each browser is an open web page 103 and 113, and in each web page is a copy/paste highlighted material 106 and 116.

In this embodiment, FIG. 1A represents the screen shot of an initial user and FIG. 1B shows the screen of the invitee. As can be seen, once the co-browsing session is underway, each user may see the same portion of the web site being viewed, the same location of the pointer 108 and 118, and the same highlighted material 106 and 116. Thus, the screens of the initial user and the invitee are essentially synchronized and may remain synchronized during the co-browsing session. During the co-browsing session, as one user moves his or her cursor, those movements may be replicated on a co-browser's display. When shopping websites are being browsed, this synchronization may be helpful or advantageous to the experience. Synchronization may occur through the web server, through communication between clients, as well through other methods. Moreover, this synchronization may also occur in real-time as well as with some network, server, or processing related delay. For example, the first user's browsing session may be delayed six hours, such that time zone distances between user's can be accommodated.

Figure 2:
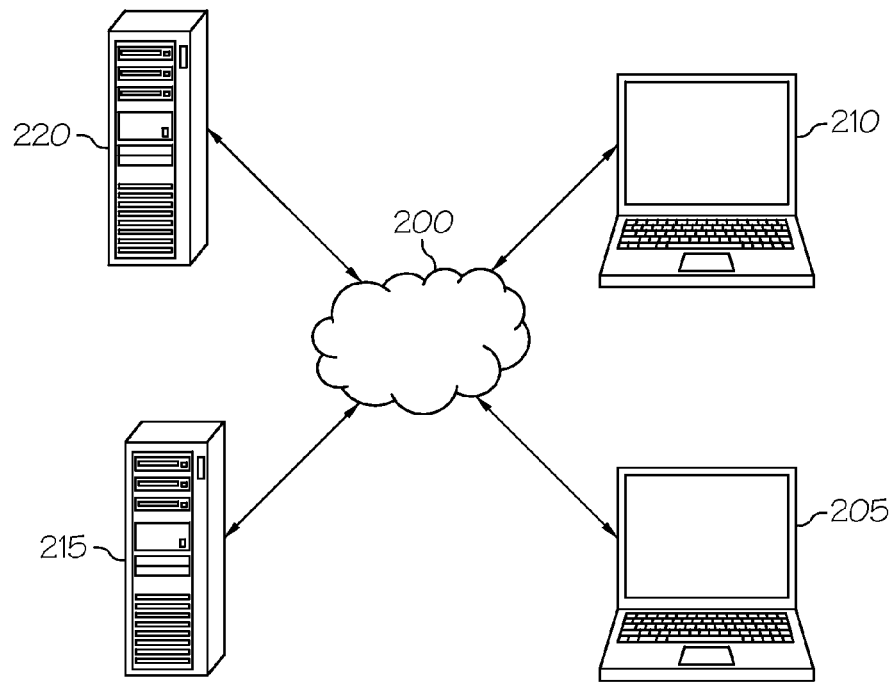
FIG. 2 shows a system of clients, servers, and a network that may be employed in accord with embodiments of the invention.

FIG. 2 shows a server and client network configuration that may be employed in embodiments of the invention. The clients 205 and 210 may each be accessible to the network 200, which is itself accessible to the servers 215 and 220. In embodiments, the client 205 may be running an HTML web browser and may be accessing information on server 215, which is serving as a web server. The web server may employ a co-browsing engine that monitors when products for sale or other information are designated for a copy/paste operation by the browser running on client 210. The co-browsing engine may generate a query at the client 205 in order to determine if the client 205 wants to associate or embed an invitation to co-browse with the copy/paste material. This query may be recorded with session information at the server 215. The query may also be recorded with session information at the client 205.

In embodiments, the query to the client 205 may also be sent from a plug-in running on the client 205 HTML web browser. This plug-in may be sent from the server 215 to the client 205 at various times, including at the initiation of the browsing session; after the server verifies that the client does not have the co-browse plug-in; once a copy/paste operation is identified; and at other times as well.

When the client 205 designates that an invitation should be generated, that invitation may be embedded in or associated with copy/pasted material placed in a communication between client 205 and client 210. This communication may be sent using communication server 220. The communication server 220 may support numerous different kinds of communication methods, including SMS messaging, MMS messaging, and email. Thus, the user on client 205 may send copy/pasted material from a website being hosted on server 215, to a user on client 210. This copy/pasted material may be sent via communication server 220, using various available communication protocols. Upon receipt and acceptance by the user of client 210, a co-browsing session on server 215 may be initiated.

Figure 3A:
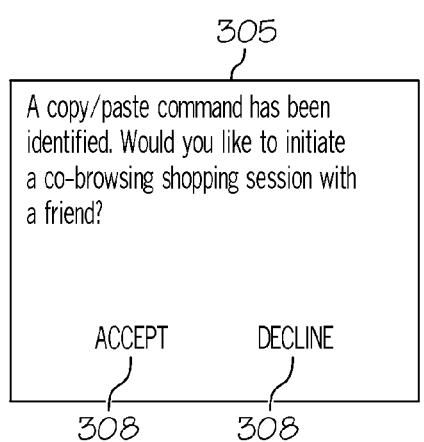
FIG. 3 shows invitations that may be generated and displayed to users in accord with embodiments of the invention.
Figure 3B:
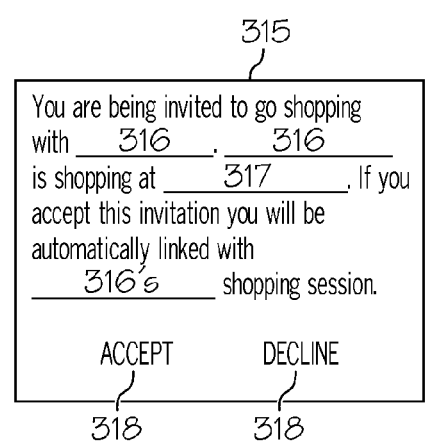

FIG. 3 shows examples of queries and invitations that may be employed in accord with embodiments of the invention. 305 shows a query that may be generated from a plug-in or co-browse engine. The plug-in may be client side while the co-browse engine may be server side. This query may be generated when a copy/paste operation is identified and the query may be presented to the user for response to the plug-in, co-browse engine or both. As can be seen, alternative buttons may be presented in the query. In embodiments, a counter may be employed such that a user may receive only a certain number of queries during a browsing session or during some other defined period. Likewise, the counter may limit the queries generated for a certain website or user.

315 shows an invitation that may be generated in accord with embodiments of the invention. As can be seen, the invitation may include a reference 316 to a specific name or user as well as a reference 317 to the specific web site being browsed or shopped at. As with the query, the invitation may include alternative buttons 318 for prompting a reply.

Figure 4:
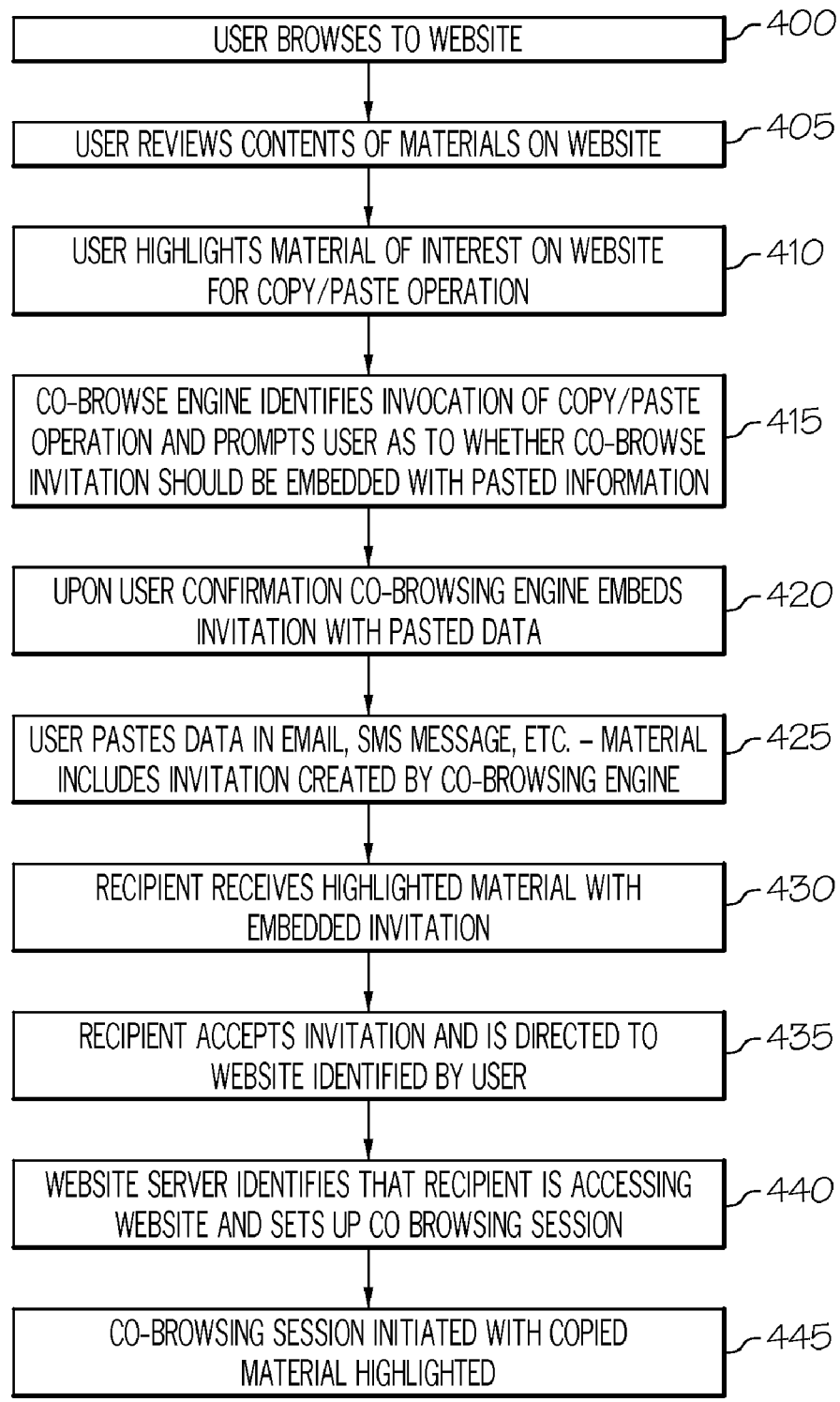
FIG. 4 shows methods that may be employed in accord with embodiments of the invention.
Figure 5:
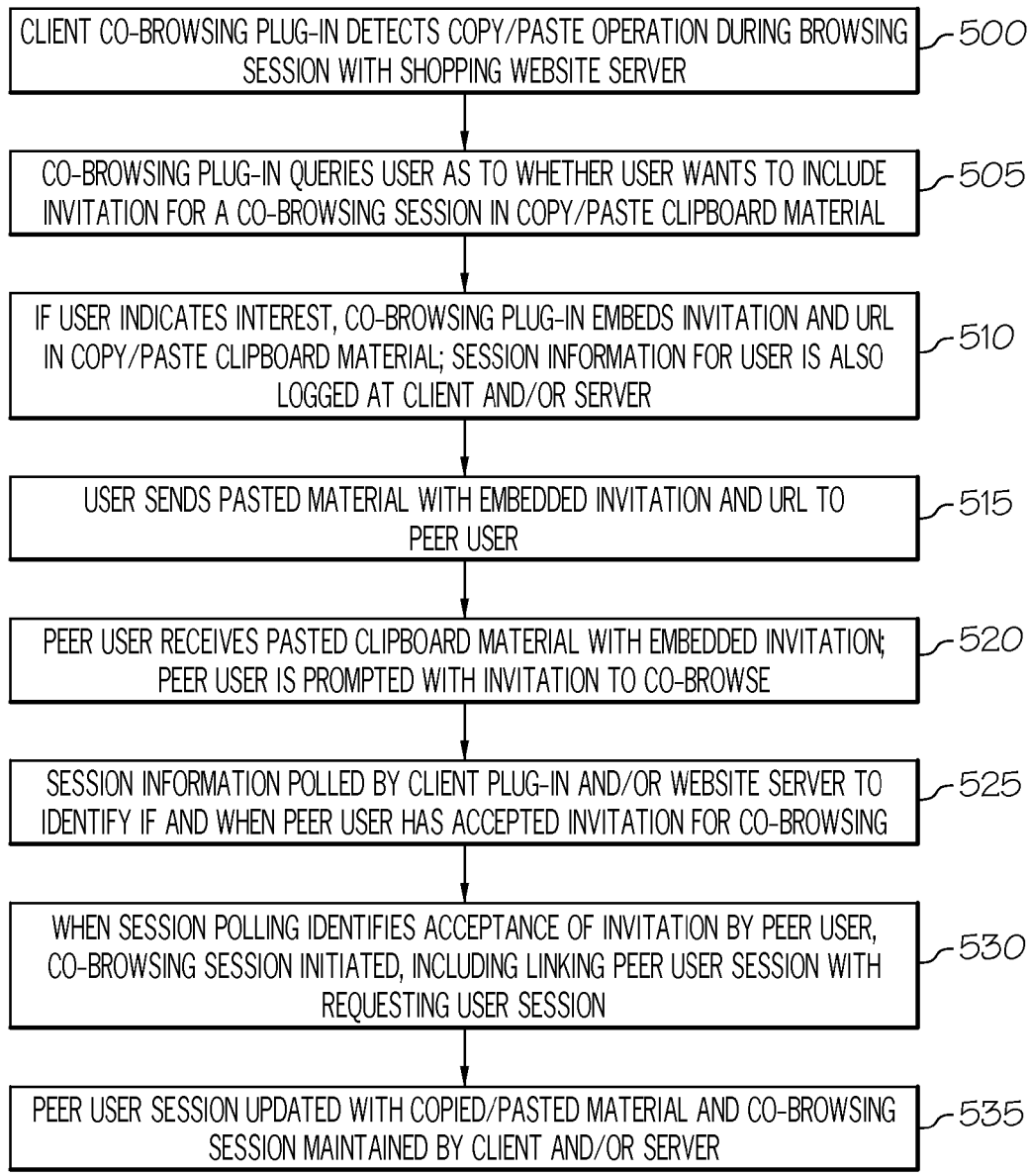
FIG. 5 shows methods that may be employed in accord with embodiments of the invention.

FIGS. 4 and 5 show actions that may be employed in accord with embodiments of the invention. Embodiments may include other actions as well, may include fewer than those specifically enumerated, and may include alterations to those enumerated in FIGS. 4 and 5 and elsewhere in the application. As shown at 400 and 405, a user may navigate to and begin browsing at a website. The user may at some point in time identify contents on the website that are of interest and may wish to share them with another. The user may, consequently, designate certain material for copy/paste activities with the intention of sending pasted material to another for further discussion. When the copy/paste activities are underway or initiated, as shown at 415, a co-browse engine may identify the copy/paste invocation and may generate a query to the user as to whether pasted data should be accompanied by an invitation to co-browse with the user at the web site or subsequent websites. If and when the user acknowledges that a co-browse invitation should be generated, the engine may embed an invitation with the data to be pasted. This is shown at 420. The invitation, now embedded with or accompanying the data to be pasted, may be sent with the pasted data to an invitee. The pasted data and invitation may be sent via email, SMS message, and other network communication methods.

As shown at 430 and 435, the invitation may be accepted and the invitee (recipient) may automatically, or with some action, be directed to the website from which the pasted material was copied. The website, using session data and/or information responsive to the invitation, may determine that the invitation has been accepted and may set up the co-browsing session or enable the recipient to join an already established co-browsing session. At 445, the website may highlight on the website, for the recipient, the pasted material received with the invitation. In some embodiments, a co-browse engine on the server may work in conjunction with a co-browser plug-in, to pose the queries or invitations described above. Also, the plug-in may perform different functions as well.

FIG. 5 shows an embodiment in which a shopping website is being examined by a shopper and the shopper wishes to invite a friend to join in the shopping experience. As shown at 500, a co-browsing plug-in at the shopper's HTML browser may detect that a product is being highlighted for copy/paste operations. As shown at 505, the co-browsing plug-in may query the shopper as to whether the shopper wishes to generate and include an invitation to join the shopping session in the event that the copied product is pasted elsewhere. If the shopper agrees to the query or indicates interest, the plug-in may embed an invitation and URL into the copied material. Also, as shown at 510, session information at the browser and the server may be updated to reflect the highlighted product and the creation of the invitation. As shown at 515, the shopper may send the pasted material and embedded invitation to a friend—both to share the product/pasted information and to see if the friend wishes to co-browse the shopping website with the shopper. At 520, the friend/peer may receive the pasted material and embedded invitation. The invitation may be self executing and may, upon receipt, generate an invitation for the friend/peer.

At the server, in a co-browsing engine and at the shopper's co-browsing plug-in session, data may be periodically polled to determine if and when the friend has accepted the invitation and has navigated to the website. A flag may also be sent to the shopper's plug-in and the co-browse engine when the invitation is accepted. This flag may include information, such as session data, necessary to link browsing sessions. When browsing sessions are identified for linking, as shown at 530, a co-browse engine at the merchandising website may create and maintain the co-browsing session. This may include highlighting the product previously pasted and sent to the friend as well as updating session data to synchronize the browsing displays of each co-browser. This maintenance is addressed at 535.

Figure 6:
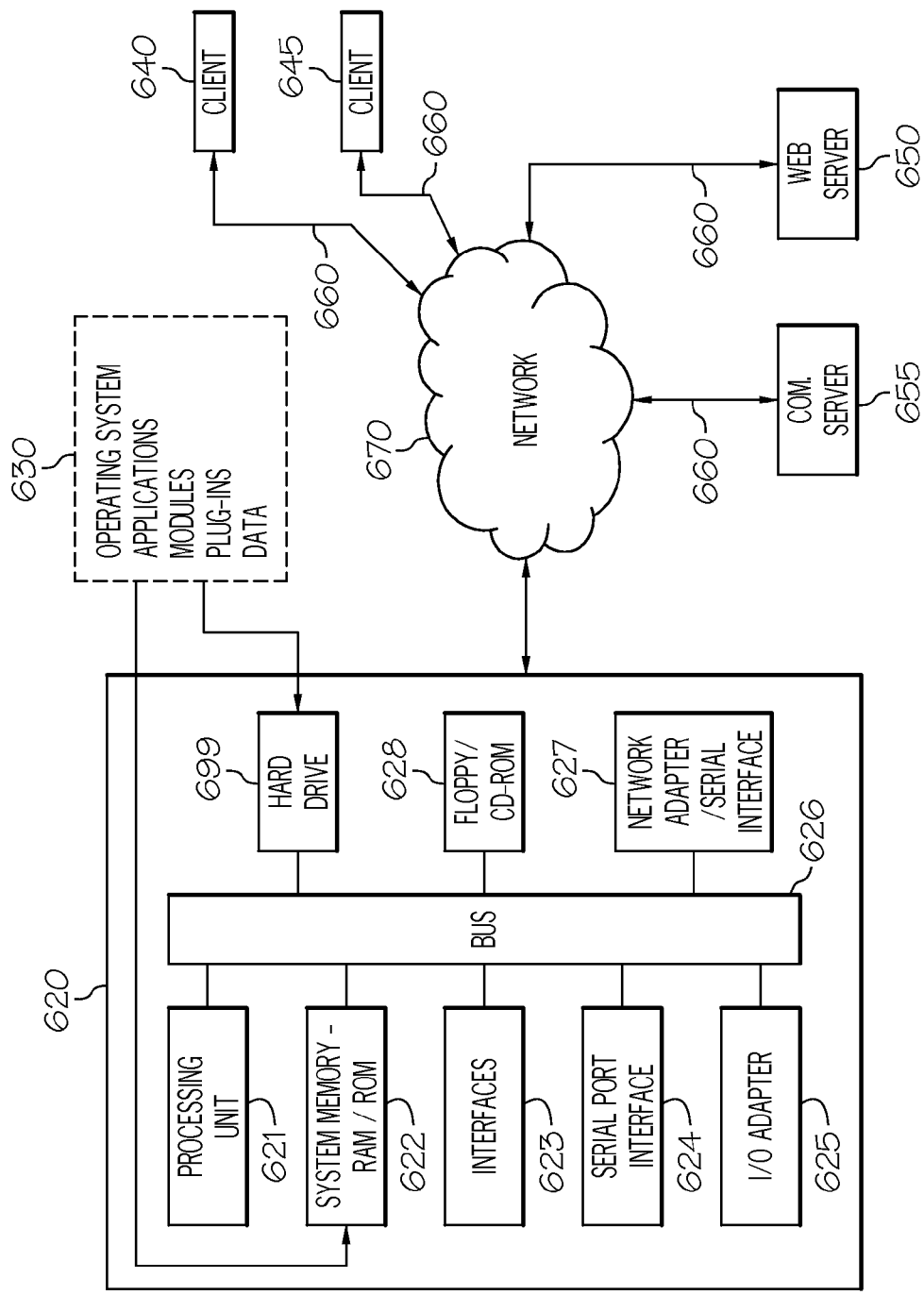
FIG. 6 shows a network with various devices that may be used in accord with embodiments of the invention.

FIG. 6 shows a system that may be employed by embodiments of the invention. This system may include a client or server 620 having instructions 630; clients 640 and 645; a network 670; a communication server 655; and a web server 650. As can be seen, the clients and servers may communicate over and through the network 670. The client or server, which is exemplary of each of the clients and servers, may store, on hard-drive memory 699 and system memory 622, instructions 630 for employing the co-browse engine and the co-browse plug-in described throughout. Also visible in the client or server 620 are the interfaces 624, I/O adapter 625, removable disk drives 628, and network adapter 627. Each may communicate via the bus 626.

In embodiments of the invention, session information in the co-browsing engine and the browser plug-in may include fields or flags to designate co-browsing status. These fields and flags can designate, for example, that an automatic co-browsing query has been presented, that a presented co-browsing query has been rejected, that an automatic invitation for co-browsing has been created, and that an automatic invitation for co-browsing has been accepted.

JavaScript or other programming code languages may be employed in embodiments for the plug-in and for the co-browse engine. Still further, in embodiments, the client plug-in code may be dojo based. Other languages and scripts may be used as well.

In embodiments, and as discussed throughout, the co-browsing session may include individual requests to the web server from individual clients to maintain the synchronization. Also, the invitation need not have the full link for the website to be co-browsed, rather, the highlighted information from the website may be retrieved from session data once the invitee begins the co-browse session.

While it is understood that the process software embodying the invention may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software may be sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiments were chosen and described in order to best explain the principles of the invention and the practical application, and to enable others of ordinary skill in the art to understand the invention for embodiments with various modifications as are suited to the particular use contemplated.

What is claimed is:

1. An article of manufacture comprising:
a non-transitory computer readable medium, the computer readable medium storing instructions thereon for providing co-browsing invitations when copy operations are detected, the instructions, which when executed, comprise:
detecting that copy operations are being performed on website data displayed to a user;
responsive to detecting copy operations, generating a co-browsing query for display to a user;
receiving, in response to the co-browsing query, an instruction to associate a co-browsing invitation with website data previously displayed to the user and previously copied by the user;
associating a co-browsing invitation with pasted website data, the pasted website data previously copied by the user,
the invitation including a query identifying the user,
the invitation including a query for a recipient to participate in a co-browsing session; and
sending the associated co-browsing invitation and pasted website data to an invitee.

2. The article of claim 1 storing instructions, which when executed, further comprise:
updating session information that an invitation for co-browsing has been created and sent; and
periodically polling session information to determine if a previously sent invitation for co-browsing has been accepted.

3. The article of claim 1 storing instructions, which when executed, further comprise:
creating a co-browsing session on a website when the co-browsing invitation is accepted and an invitation recipient has an established browsing session on the website.

4. The article of claim 1 storing instructions, which when executed, further comprise:
querying session data to identify website data copied by a user; and
providing instruction to highlight the identified website data once the co-browsing session starts.

5. The article of claim 1 storing instructions wherein the website data is services or merchandise offered for sale on the website.

6. The article of claim 1 storing instructions, wherein the copy operations detected are performed in a web-browser and wherein the query is displayed to the user after determining if a threshold for displaying queries has been exceeded.

7. The article of claim 1, wherein the instructions are JavaScript instructions for a web server.

8. The article of claim 1, wherein the instructions are JavaScript instructions for a web browser plug-in.

9. A method comprising:
detecting that copy operations are being performed on website data displayed to a user;
responsive to detecting copy operations, generating a co-browsing query for display to a user;
receiving, in response to the co-browsing query, an instruction to associate a co-browsing invitation with website data previously displayed to the user and previously copied by the user;
associating a co-browsing invitation with pasted website data, the pasted website data previously copied by the user, the invitation including a query identifying the user, the invitation including a query for a recipient to participate in a co-browsing session; and,
sending the associated co-browsing invitation and pasted website data to an invitee.

10. The method of claim 9 further comprising:
updating session information that an invitation for co-browsing has been created and sent; and
periodically polling session information to determine if a previously sent invitation for co-browsing has been accepted.

11. The method of claim 9 further comprising:
creating a co-browsing session on a website when the co-browsing invitation is accepted and an invitation recipient has an established browsing session on the website.

12. The method of claim 9 further comprising:
querying session data to identify website data copied by a user; and
providing instruction to highlight the identified website data once the co-browsing session starts.

13. The method of claim 9 wherein the website data is services or merchandise offered for sale on the website.

14. The method of claim 9, wherein, wherein the copy operations detected are performed in a web-browser and wherein the query is displayed to the user after determining if a threshold for displaying queries has been exceeded.

15. The method of claim 9, wherein detecting, receiving, and associating are performed using JavaScript instructions for a web server.

16. The method of claim 9, wherein detecting, receiving, and associating are performed using JavaScript instructions for a web-browser.

17. A computer comprising:
a non-volatile computer readable medium, the computer readable medium storing instructions thereon for providing co-browsing invitations when copy operations are detected, the instructions, which when executed, comprise:
detecting that copy operations are being performed on website data displayed to a user;
responsive to detecting copy operations, generating a co-browsing query for display to a user;
receiving, in response to the co-browsing query, an instruction to associate a co-browsing invitation with website data previously displayed to the user and previously copied by the user;
associating a co-browsing invitation with pasted website data, the pasted website data previously copied by the user, the invitation including a query identifying the user, the invitation including a query for a recipient to participate in a co-browsing session; and,
sending the associated co-browsing invitation and pasted website data to an invitee.

18. The computer of claim 17 comprising further instructions, which when executed, comprise:
updating session information that an invitation for co-browsing has been created and sent; and periodically polling session information to determine if a previously sent invitation for co-browsing has been accepted.

19. The computer of claim 17, storing further instructions, which when executed, further comprise:
creating a co-browsing session on a website when the co-browsing invitation is accepted and an invitation recipient has an established browsing session on the website.

20. The computer of claim 17, storing further instructions, which when executed, further comprise:
querying session data to identify website data copied by a user; and
providing instruction to highlight the identified website data once the co-browsing session starts.

* * * * *